No. 887,204. PATENTED MAY 12, 1908.
A. G. LEONARD.
WATERING DEVICE.
APPLICATION FILED JULY 16, 1906.
2 SHEETS—SHEET 1.
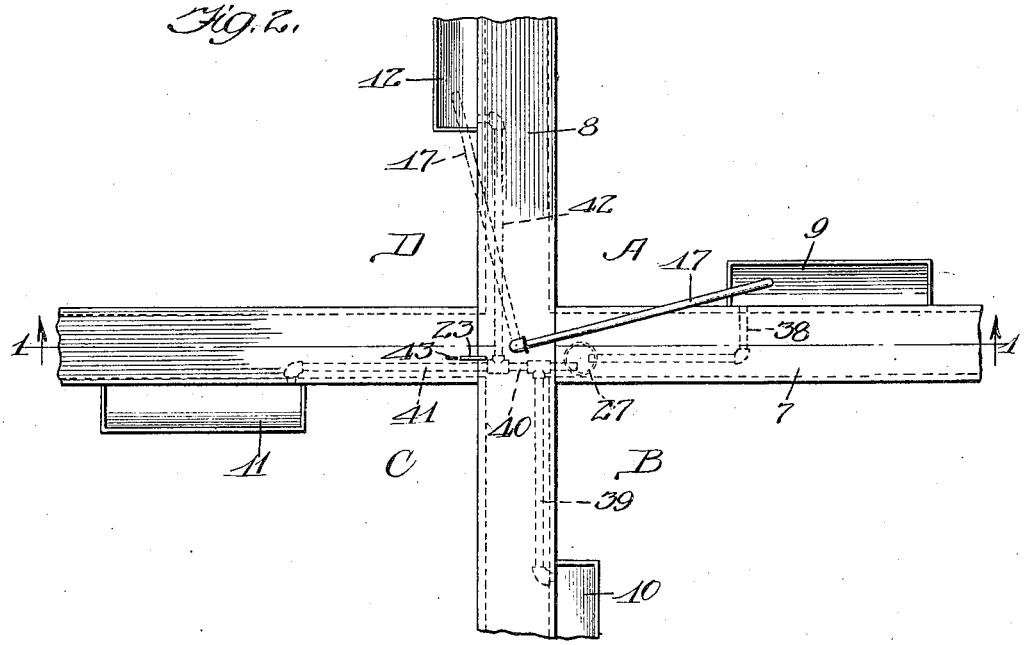
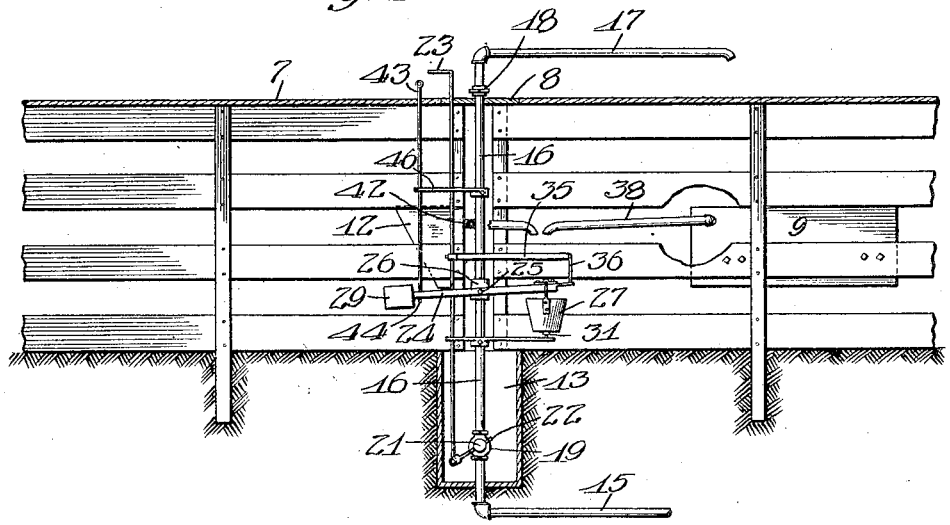
Witnesses:
Robert H. Weir
Geo. D. Perry
Inventor:
Arthur G. Leonard,
by Bond, Adams, Pickard & Jackson
his Attys.
THE NORRIS PETERS CO., WASHINGTON, D. C.

No. 887,204. PATENTED MAY 12, 1908.
A. G. LEONARD.
WATERING DEVICE.
APPLICATION FILED JULY 16, 1906.
2 SHEETS—SHEET 2.
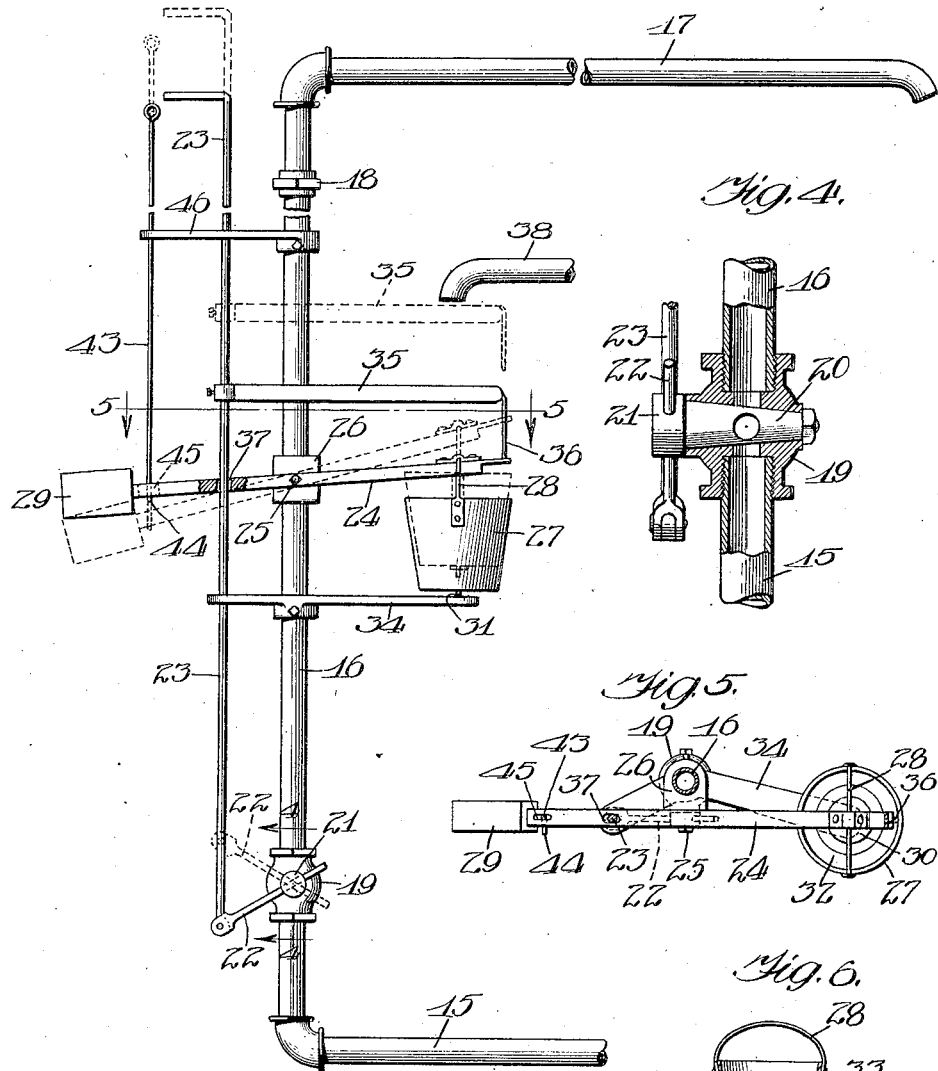

UNITED STATES PATENT OFFICE.

ARTHUR G. LEONARD, OF CHICAGO, ILLINOIS.

WATERING DEVICE.

No. 887,204.  Specification of Letters Patent.  Patented May 12, 1908.

Application filed July 16, 1906. Serial No. 326,444.

*To all whom it may concern:*

Be it known that I, ARTHUR G. LEONARD, a citizen of the United States, residing at Chicago, in the county of Cook and State of Illinois, have invented certain new and useful Improvements in Watering Devices, of which the following is a specification, reference being had to the accompanying drawings.

My invention relates to appliances for watering stock, and has for its object to provide an improved device particularly adapted for use at stock yards.

In market places, where large numbers of cattle, sheep, and other animals are marketed daily, the animals are confined in the pens until removed by the purchasers, and it is customary to provide each pen with a watering trough of sufficient capacity to accommodate the animals that may be confined in it. Heretofore the practice has been to provide water connections so that the different troughs could readily be filled but no provision has been made for automatically shutting off the water when a sufficient quantity has been supplied, the result being that it was necessary either for the attendant to remain at each pen until sufficient water had been supplied to it or to go away leaving the water running with consequent loss through waste. In large stock yards this wastage is quite a large item, and is objectionable not only because of the useless expense, but also because of its creating a shortage of water, and to avoid these objections is the principal object of my invention.

A further object is to provide means by which a plurality of troughs may be supplied by a single hydrant or water connection, and to provide certain other improvements, which will be hereinafter pointed out.

I accomplish these objects as illustrated in the drawings and hereinafter described.

That which I believe to be new will be pointed out in the claims.

In the accompanying drawings,—Figure 1 is a side elevation, partly in section, illustrating the application of my improved watering device; Fig. 2 is a plan view thereof; Fig. 3 is an enlarged detail of the watering device; Fig. 4 is a view, partly in section, showing the valve and connections; Fig. 5 is a cross-section on line 5—5 of Fig. 3; and Fig. 6 is a vertical section of the bucket.

Referring to the drawings,—A—B—C—D indicate four pens separated by fences 7—8, which are preferably provided with the usual running board on which the attendant may walk.

9—10—11—12 indicate, respectively, troughs in the several pens, which are preferably secured to the fences, as is shown in Figs. 1 and 2.

13 indicates a well or pit provided under the adjacent corners of the different pens, as shown in Fig. 1.

15 indicates a water pipe connecting with a hydrant or pipe 16 which rises through the well 13 to a point above the fence where it is provided with a spout or extension 17 swiveled to the hydrant 16, as shown at 18 in Fig. 1, so that it may be rotated to bring it into position over the different troughs 9, 10, 11 and 12 it being understood that said troughs are located at substantially the same distance from the hydrant 16, and that the extension or nozzle 17 is of sufficient length to discharge into the different troughs.

19 indicates a valve located in the well 13 so as to be protected from frost, said valve being preferably of the construction shown in detail in Fig. 4, being provided with a plug 20 having a perforated boss 21 through which extends a rod 22. Said rod is adapted to slide in the boss 21 to accommodate different adjustments of the operating rod hereinafter described.

23 indicates the operating rod, which is pivotally connected at its lower end to one end of the rod 22 and extends up above the top of the fence, as shown in Fig. 1. By raising said rod the plug 20 may be rotated to open the valve and permit water to be discharged through the hydrant 16. When the rod 23 descends, the valve is closed,—the weight of the rod being sufficient to operate the valve. The position of the rod 23, when the valve is open, is shown in dotted lines in Fig. 3.

24 indicates an arm, which is pivotally connected at 25 with a block or other support 26 connected with the hydrant 16 so that said arm may swing freely in a vertical plane. At one end said arm 24 is provided with a bucket 27 suspended therefrom, preferably by a bail 28, and at the other end it is provided with a counterbalance weight 29, as best shown in Figs. 1 and 3. The weight 29 is somewhat greater than that of the empty bucket 27 but is not equal to the weight of the bucket when full. Obviously, the operative weight of the counterbalance may be varied by changing its position on the arm 24.

The construction of the bucket is best shown in Fig. 6, from which it will be seen that it is provided with an opening in the bottom having a check valve 30, the latter having a pin 31 which projects below the bottom of the bucket when the valve is seated, and a stem 32 which projects up into the bucket and through a guide 33. By raising the valve 30 from its seat the contents of the bucket may be discharged.

34 indicates a supporting bar which is secured to the hydrant 16 below the arm 24 in such position as to lie under the bucket 27, so that when the bucket is in its lowermost position it rests upon said bar, and the valve 30 is held up out of operative position by the engagement of the pin 31 with said bar. The opposite end of said bar 34 serves as a guide for the operating rod 23, as shown in Fig. 3.

35 indicates an arm adjustably secured to the operating rod 23 at a point above the arm 24 and extending over said arm 24, as shown in Fig. 3. The outer end of said arm 35 is bent down, as shown at 36 in Fig. 3, so as to be in position to strike the end of the arm 24 near the bucket 27 and overcome the weight of the counterbalance 29 when the operating rod 23 is in its lowermost position. When said operating rod is raised, however, the arm 35 is moved into the position shown in dotted lines in Fig. 3, so that the bucket is then free to rise under the action of the counterbalance weight 29.

When the operating rod 23 is lifted to open the valve it is locked in its raised position by means of the arm 24, which, as shown in Figs. 3 and 5, is provided with a passage 37 through which said rod passes. Said passage is slightly larger than the rod 23 and is so disposed that when the arm 24 is in the position shown in full lines in Fig. 3, at which time the bucket is in its lowermost position, the sides of the passage do not bind on said rod. When, however, the arm 24 assumes the position shown in dotted lines in Fig. 3 the sides of said passage grip or bite into the rod 23 thereby holding it against descent. By this means the rod 23 may be lifted to open the valve and will then be held in such position, thereby holding the valve open until the arm 24 is rocked to release its bite upon said rod. This rocking of the arm 24 is accomplished by means of the overflow from the several troughs. As shown in Fig. 2, each of the troughs is provided with means by which this overflow may be discharged into the bucket 27, there being an overflow pipe 38 leading from trough 9 to a point over the bucket, a pipe 39 leading from tank 10 to pipe 40, which also discharges into the bucket, and pipes 41 and 42 leading, respectively, from troughs 11 and 12 to the pipe 40. Thus, when the spout 17 is adjusted to fill any trough, and the water turned on by raising the rod 23, as soon as that trough is filled the overflow is discharged into bucket 27, which thereupon drops, rocking the arm 24 to release the operating rod and permit it to close the valve. When the bucket descends, the valve 30 therein is raised from its seat permitting the water therein to be discharged. The bucket, however, does not again rise under the influence of the counterbalance weight until the rod 23 is again lifted, for the reason that it is held down by the arm 35.

Inasmuch as it is sometimes desirable to shut off the water before a trough has been filled I have provided for accomplishing that end. This is effected by means of a rod 43 arranged beside the operating rod 23 and bent at its lower end to project under the arm 24 near the counterbalance weight 29, as shown at 44 in Fig. 5. By this means the effect of the counterbalance may be positively overcome by raising the rod 43, thereby permitting the bucket to descend and consequently releasing the operating rod 23 and shutting the valve 19. Preferably the rod 43 is guided by extending it through an enlarged passage 45 in the arm 24, said passage being of sufficient size so that it does not bind on said rod, but any other suitable means of guiding said rod may be employed.

46 indicates a guide for the upper end portions of the rods 23 and 43, as shown in Fig. 3.

As shown in Figs. 1 and 2, the rods 23 and 43 and the other operating parts of the apparatus lie within the fencing, which is double, as indicated by dotted lines in Fig. 2, so that they are protected from injury by animals in the pen.

By my improved apparatus the attendant may start the water running into any given trough and then go off and attend to other pens, and as soon as the trough is filled the water will be shut off. The spout can then be directed to another trough and the same operation repeated until all the troughs have been supplied, and in no case is there any waste other than the small quantity of water that is discharged into the bucket. I thus provide adequate means for watering the stock much more economically, both as regards labor, time and water, than has heretofore been the case.

I wish it to be understood that my invention is not restricted specifically to the details of the construction illustrated and described except in so far as they are particularly claimed, as my invention includes generically the subject-matter of the broader claims.

That which I claim as my invention and desire to secure by Letters Patent is,—

1. A watering apparatus, comprising a plurality of troughs, a supply pipe adapted to discharge into said troughs, a controlling valve, means for opening said valve, and means coöperating with each of the troughs for automatically closing said valve when any trough has been filled.

2. A watering apparatus, comprising a plurality of troughs, a supply pipe adapted to discharge into said troughs, a controlling valve, means for opening said valve, and means coöperating with each of the troughs operated by the overflow of the different troughs for closing said valve when any trough has been filled.

3. A watering apparatus, comprising a plurality of troughs, a hydrant, a spout connected therewith and adapted to discharge into said troughs, a controlling valve, means for opening said valve, and means coöperating with each of the troughs for automatically closing said valve when any of said troughs has been filled.

4. A watering apparatus, comprising a pipe, a trough arranged to receive water from said pipe, a rocking arm, a bucket carried by said arm, said trough being arranged to overflow into said bucket, a valve for said pipe, and a vertically-movable operating rod therefor, said valve being opened by raising said rod and closed by lowering the same said arms having means acting to engage and lock said rod in its raised position when said rod is raised and the bucket is in its uppermost position said means being automatically disengaged to permit the rod to drop when the bucket descends.

5. A watering apparatus, comprising a pipe, a trough arranged to receive water from said pipe, a rocking arm, a bucket carried by said arm, said trough being arranged to overflow into said bucket, a valve for said pipe, a vertically-movable operating rod therefor, said valve being opened by raising said rod and closed by lowering the same, said arm having means acting to engage and lock said rod in its raised position when said rod is raised and the bucket is in its uppermost position, said means being automatically disengaged to permit the rod to drop when the bucket descends, and independent means for rocking said arm to release said rod.

6. A watering apparatus, comprising a pipe, a trough, into which said pipe discharges a rocking arm, a valved bucket carried at one end portion thereof, a counterbalance at the other end portion of said arm, a valve for said pipe, a vertically-movable operating rod, said arm being adapted to engage and lock said rod in its raised position when said bucket is also in its raised position, means for conducting the overflow from said trough into said bucket, and means carried by said rod for holding said bucket in its lowermost position when said rod is also in its lowermost position.

7. The combination of a plurality of pens separated by intersecting fences, a plurality of troughs at adjacent corners of said pens, a water-supply pipe having an adjustable spout arranged to discharge into the different troughs in said pens, a valve for cutting off the flow of water through said spout, and means operated by overflow from either of said troughs for automatically closing said valve.

8. The combination of a plurality of pens separated by intersecting fences, a plurality of troughs at adjacent corners of said pens, a water-supply pipe having an adjustable spout arranged to discharge into the different troughs in said pens, a valve for cutting off the flow of water through said spout, and means coöperating with each of said troughs for automatically closing said valve when the trough has been filled.

9. The combination of a plurality of pens separated by intersecting fences, a plurality of troughs at adjacent corners of said pens, a well under the adjacent corners of said pens, a water pipe rising from said well to a point above the fences, said pipe having a spout adapted to be rotated to discharge into the several troughs, a valve controlling the flow of water through said spout, and means for automatically closing said valve when any trough has been filled.

ARTHUR G. LEONARD.

Witnesses:
ORVIS T. HENKLE,
MELVILLE F. HORINE.